(12) United States Patent
Lee

(10) Patent No.: US 6,305,109 B1
(45) Date of Patent: Oct. 23, 2001

(54) STRUCTURE OF SIGNBOARD

(76) Inventor: Chi-Huang Lee, 9th, No. 378, Chang Chun Road, Taipei City (TW)

( * ) Notice: Subject to any disclaimer, the term of this patent is extended or adjusted under 35 U.S.C. 154(b) by 0 days.

(21) Appl. No.: 09/457,071

(22) Filed: Dec. 9, 1999

(51) Int. Cl.[7] .................................................. G09F 13/18
(52) U.S. Cl. ............................................. 40/546; 40/617
(58) Field of Search .......................... 40/546, 617, 605; 362/31; 160/135

(56) References Cited

U.S. PATENT DOCUMENTS

| | | | | |
|---|---|---|---|---|
| 2,082,724 | * | 6/1937 | Shelor | 40/546 |
| 2,206,866 | * | 7/1940 | Fuller, Jr. | 40/546 |
| 2,611,981 | * | 9/1952 | Whitebread | 40/546 |
| 2,994,148 | * | 8/1961 | Endelson | 40/546 |
| 3,591,941 | * | 7/1971 | Jaffe, Jr. | 40/546 |
| 5,228,223 | * | 7/1993 | Lan | 40/546 X |
| 5,365,411 | * | 11/1994 | Rycroft et al. | 40/546 X |
| 5,433,024 | * | 7/1995 | Lerner | 40/546 |
| 5,537,766 | * | 7/1996 | Nickens et al. | 40/605 |
| 5,570,971 | * | 11/1996 | Rixen et al. | 160/135 X |
| 5,640,792 | * | 6/1997 | Smith et al. | 40/546 |
| 5,842,297 | * | 12/1998 | Tung | 40/546 |
| 5,950,340 | * | 9/1999 | Woo | 40/546 X |

\* cited by examiner

*Primary Examiner*—Joanne Silbermann
(74) *Attorney, Agent, or Firm*—Rosenberg, Klein & Lee

(57) ABSTRACT

A signboard, which includes a rail, the rail having a longitudinally extended bottom opening, two parallel flanges longitudinally downwardly extended at two opposite sides of the bottom opening, at least one longitudinal coupling groove on the periphery thereof, and two longitudinal mounting grooves bilaterally disposed on the inside; a LED circuit board mounted in the longitudinal mounting grooves inside the rail, the LED circuit board having a plurality of light emitting diodes at a bottom side thereof; a light conducting board mounted in the bottom opening on the rail and fixedly connected between the parallel flanges, the light conducting board having a design; two end caps respectively covered on two distal ends of said rail; and a plurality of mounting members respectively fastened to the rail for positioning, said mounting members each having at least one coupling rib respectively coupled to the at least one longitudinal coupling groove on the rail.

2 Claims, 8 Drawing Sheets

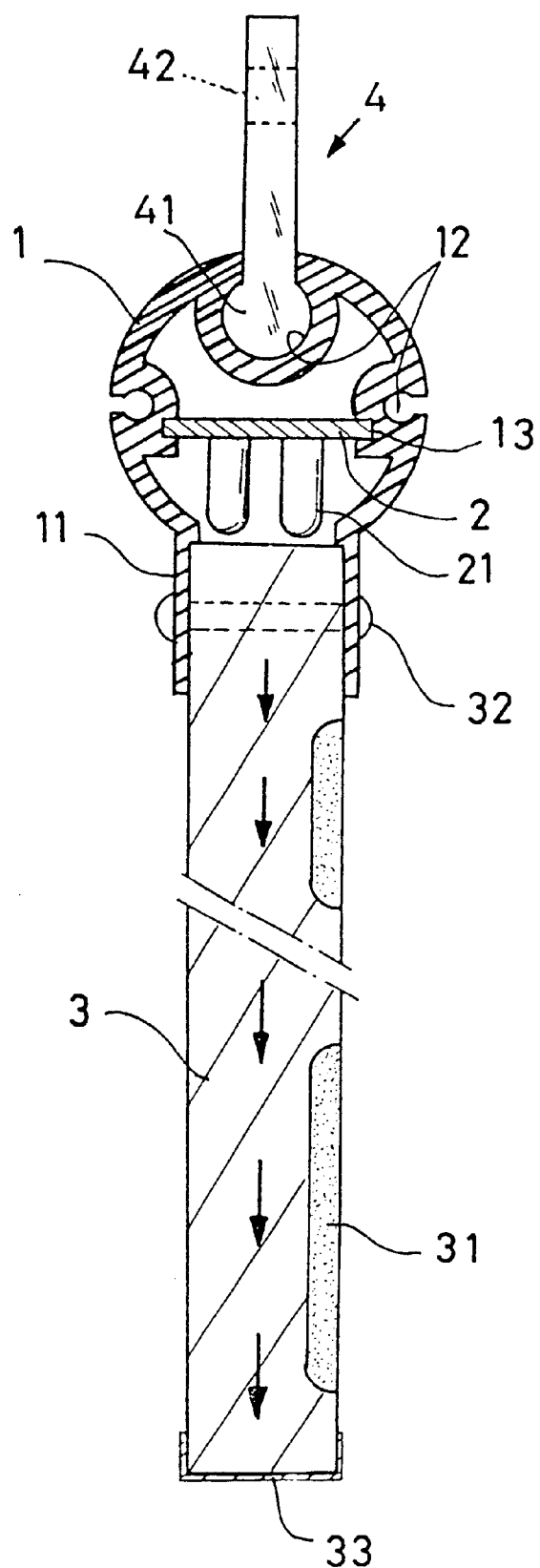
F I G. 3

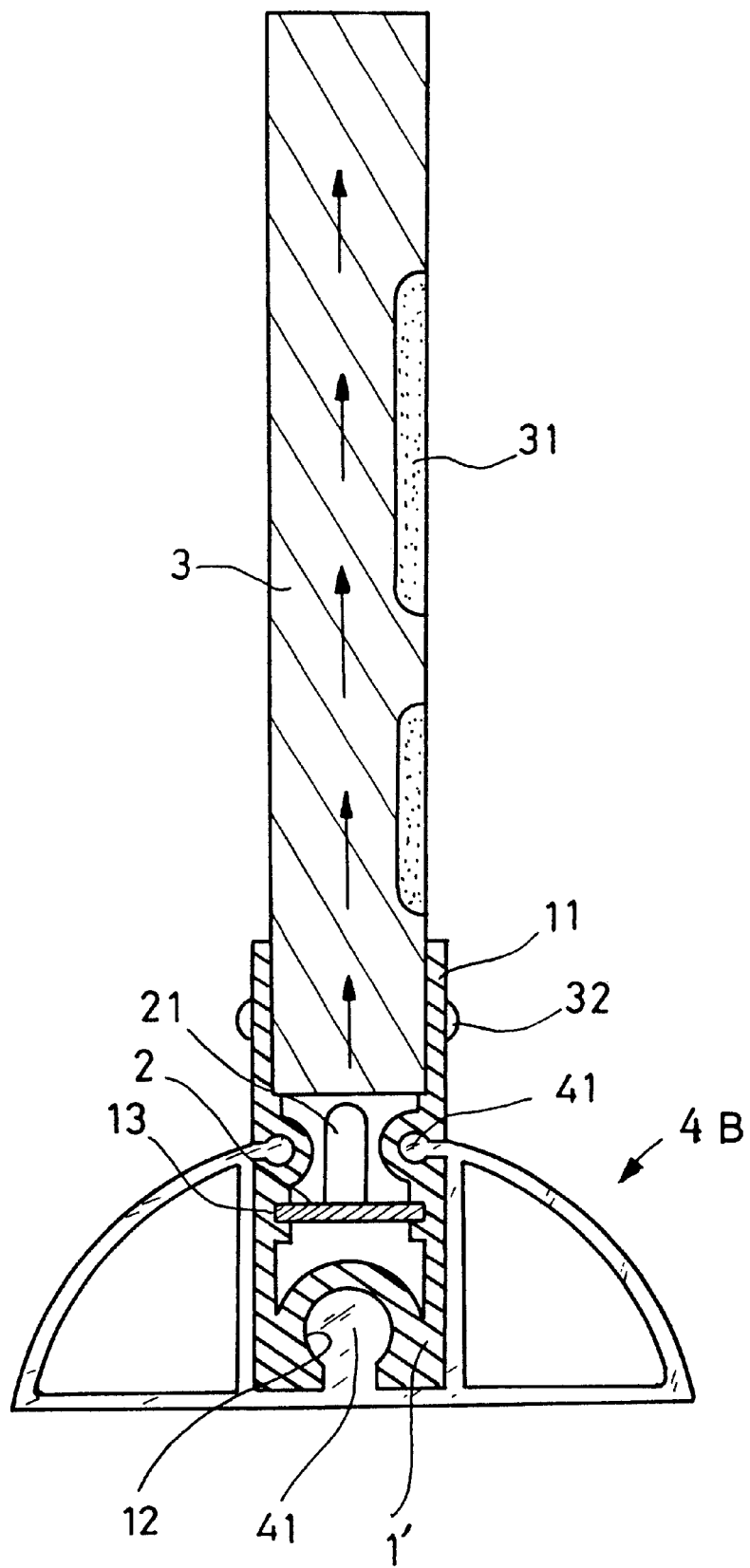
F I G. 8

STRUCTURE OF SIGNBOARD

BACKGROUND OF THE INVENTION

The present invention relates to a signboard, and more particularly to such a signboard, which comprises a rail, a light conducting board fastened to the rail, a LED circuit board mounted inside the rail and controlled to illuminate the design on the light conducting board, and a plurality of mounting members coupled to the rail for positioning.

In public places and buildings indicator lights and signboards are installed to give indications. A signboard for this purpose is generally comprised of a metal casing having a transparent sidewall marked with a design, and a lamp circuit assembly installed inside the casing and controlled to illuminate the design on the casing. This design of signboard is bulky and less attractive. Because welding metal elements into shape makes the metal casing of the signboard, the metal casing is heavy and complicated to manufacture. Further, because the lamp circuit assembly is comprised of a lamp tube and ballast, it produces a light of a particular color only.

SUMMARY OF THE INVENTION

It is one object of the present invention to provide a signboard, which uses color light emitting diodes for illumination. It is another object of the present invention to provide a signboard, which is compact and high mobility. It is still another object of the present invention to provide a signboard, which causes a sense of beauty. It is still another object of the present invention to provide a signboard, which can be conveniently installed in any of a variety of places. According to the present invention, the signboard comprises a rail, the rail having a longitudinally extended bottom opening, two parallel flanges longitudinally downwardly extended at two opposite sides of the bottom opening, at least one longitudinal coupling groove on the periphery thereof, and two longitudinal mounting grooves bilaterally disposed on the inside; a LED circuit board mounted in the longitudinal mounting grooves inside the rail, the LED circuit board having a plurality of light emitting diodes at a bottom side thereof; a light conducting board mounted in the bottom opening on the rail and fixedly connected between the parallel flanges, the light conducting board having a design; two end caps respectively covered on two distal ends of said rail; and a plurality of mounting members respectively fastened to the rail for positioning, said mounting members each having at least one coupling rib respectively coupled to the at least one longitudinal coupling groove on the rail. Because light emitting diodes are used to provide illumination, battery can be used to provide the necessary working voltage, enabling the signboard to be used indoors, or outdoors where no city power supply is available. Because the LED circuit assembly is installed inside the rail and the light conducting board has a certain thickness (about 10 mm), the whole structure is strong and weatherproof. Furthermore, because the whole assembly of the signboard is thin but strong, it can be used in different places for different purposes.

BRIEF DESCRIPTION OF THE DRAWINGS

FIG. 3 is a sectional view of a signboard according to the present invention showing the direction of the illumination of light from the LED circuit assembly.

FIG. 8 is a sectional view of still another alternate form of the present invention, showing the mounting members supported on a flat surface.

DETAILED DESCRIPTION OF THE PREFERRED EMBODIMENT

Figure 1:
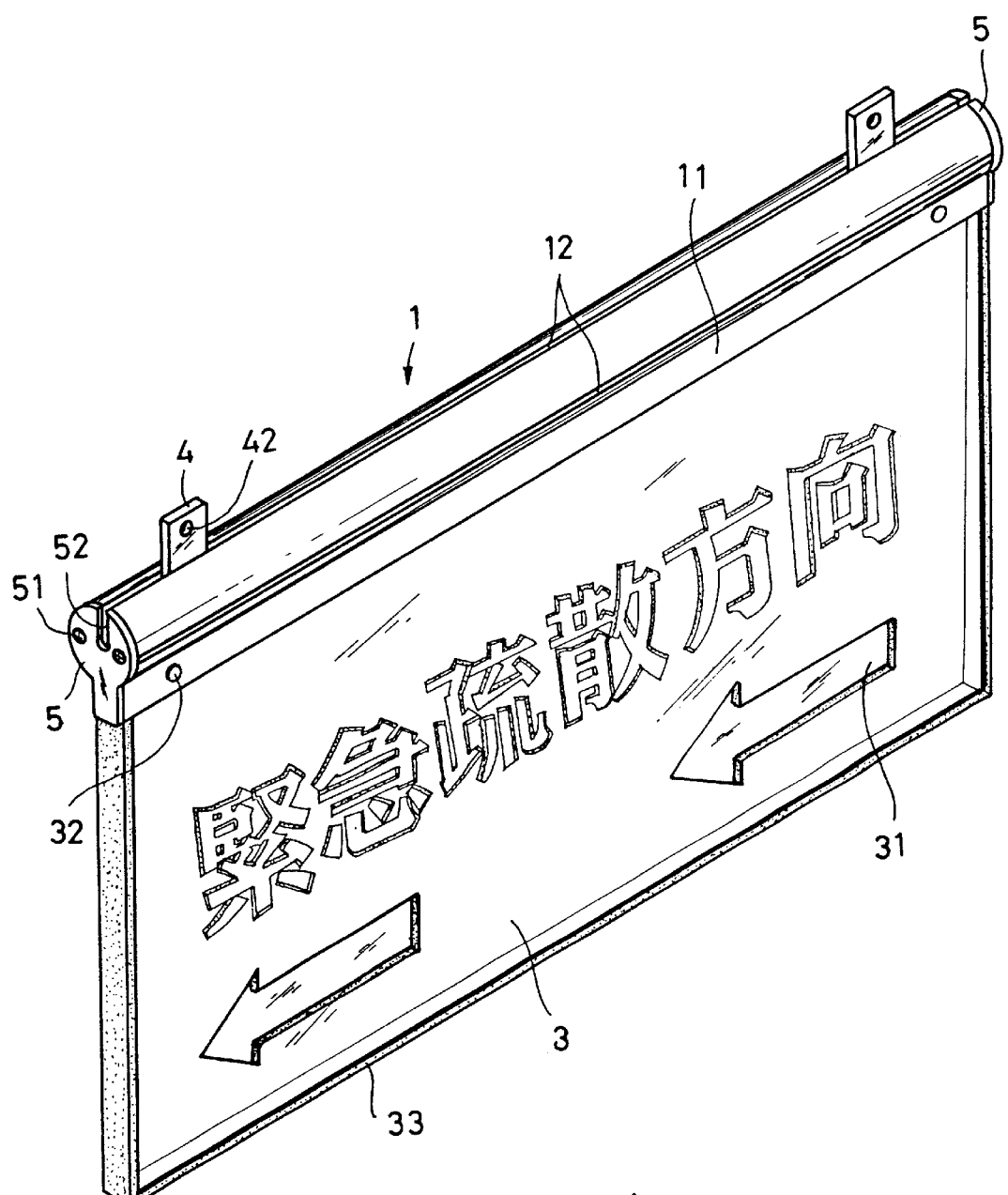
FIG. 1 is a perspective view of a signboard according to one embodiment of the present invention.
Figure 2:
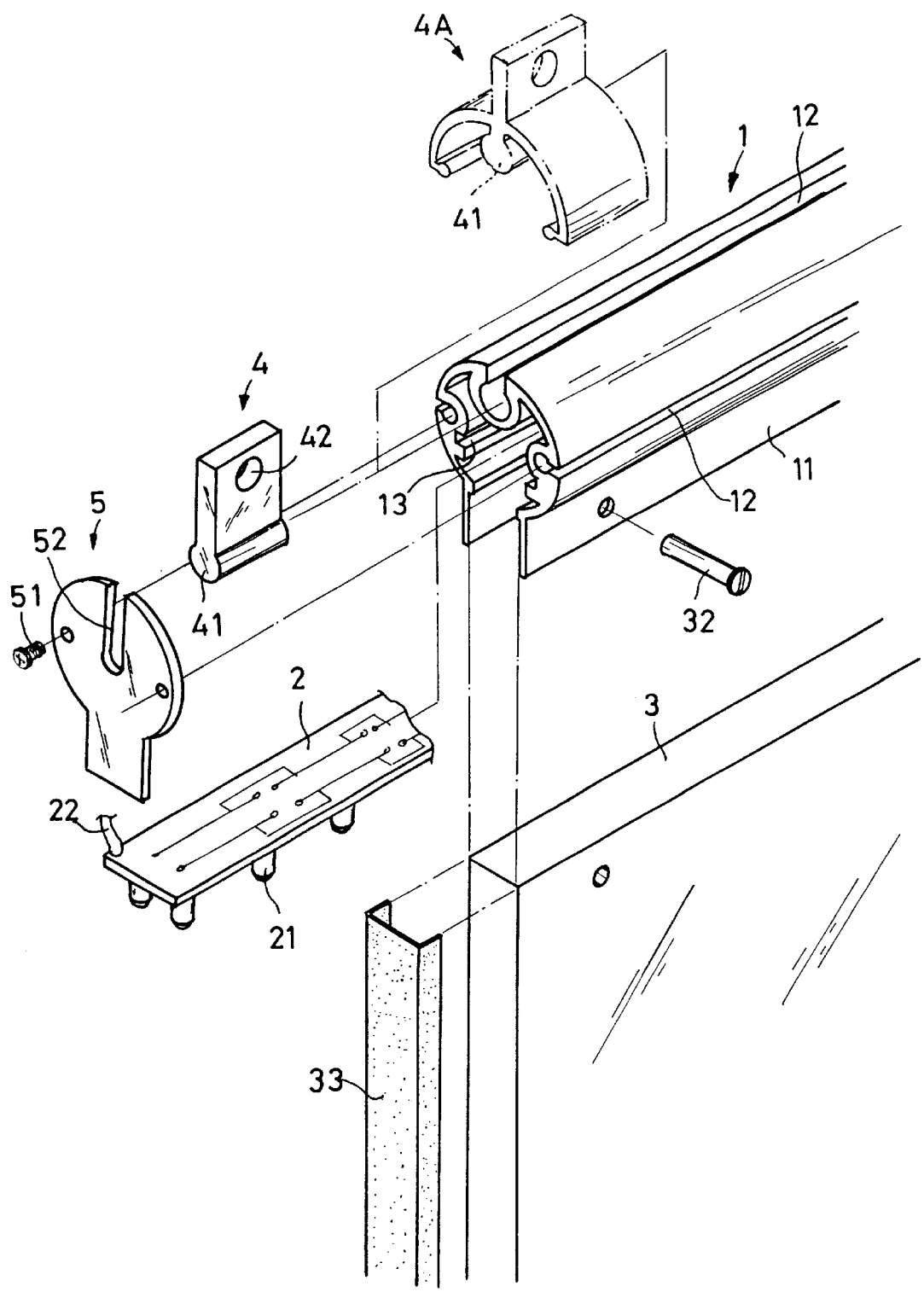
FIG. 2 is an exploded view of a signboard according to one embodiment of the present invention.

Referring to Figures from 1 through 5, a signboard in accordance with one embodiment of the present invention is shown comprised of a rail 1, a LED circuit board 2, a light conducting board 3, a plurality of mounting members 4 or 4A, and two end caps 5.

The rail 1 is a tubular member that can be extruded from metal or injection-molded from plastics, comprising two parallel flanges 11 longitudinally downwardly extended at two opposite sides of a bottom opening thereof, at least one longitudinal coupling groove 12 on the outside wall thereof, and two longitudinal mounting grooves 13 bilaterally disposed on the inside. In the embodiment shown in Figures from 2 through 4, the rail 1 has three longitudinal coupling grooves 12 equiangularly spaced around the periphery. In the embodiment shown in FIGS. 1 and 6, the rail 1 has only one longitudinal coupling groove 12. The LED circuit board 2 is mounted inside the rail 1 and inserted into the longitudinal mounting grooves 13, having rows of LEDs (light emitting diodes) at the bottom side thereof. The light conducting board 3 is inserted with one side thereof into the bottom opening on the rail 1 and fixedly connected between the parallel flanges 11 by fastening elements 32. The mounting members 4 or 4A each comprise at least one coupling rib 41 respectively coupled to the at least one longitudinal coupling groove 12 at the tail 1, and a top hanging hole 42 for hanging. The end caps 5 are respectively fastened to two distal ends of the rail 1 by screws 51, each having a wire slot 52 for enabling the electric wire 22 of the LED circuit board 2 to be extended to the outside and connected to power source.

Figure 4:
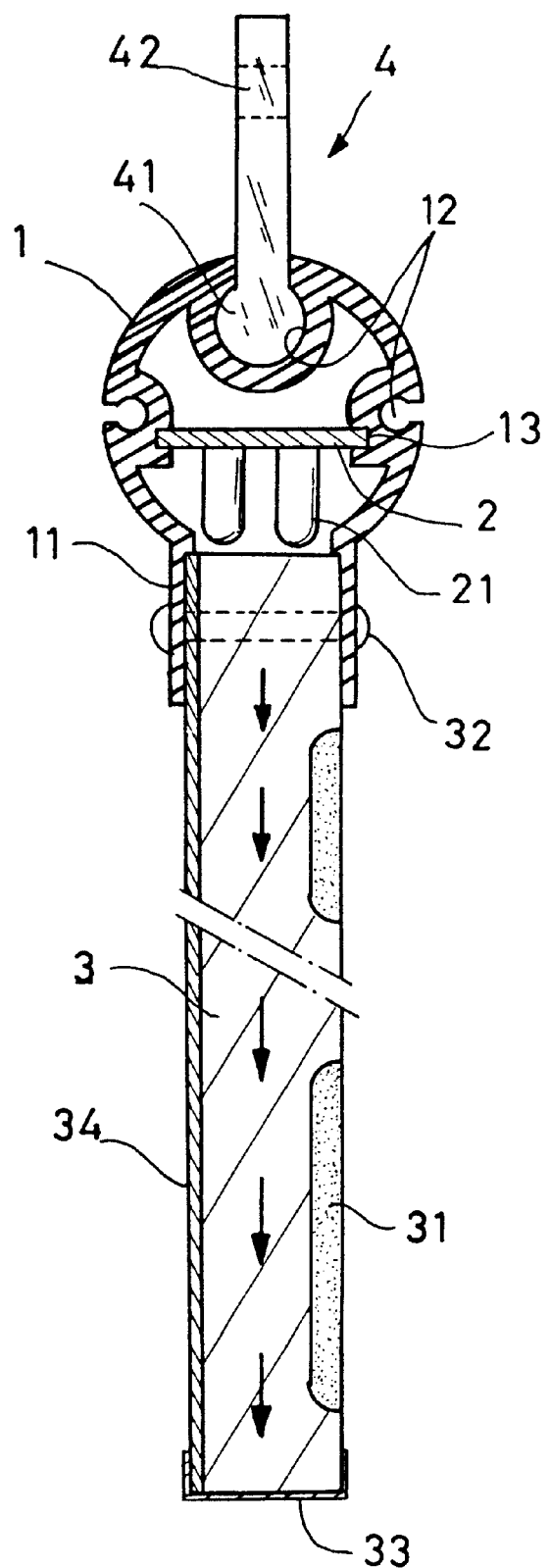
FIG. 4 is similar to FIG. 3 but showing an opaque back board covered on the back side of the light conducting board.
Figure 5:
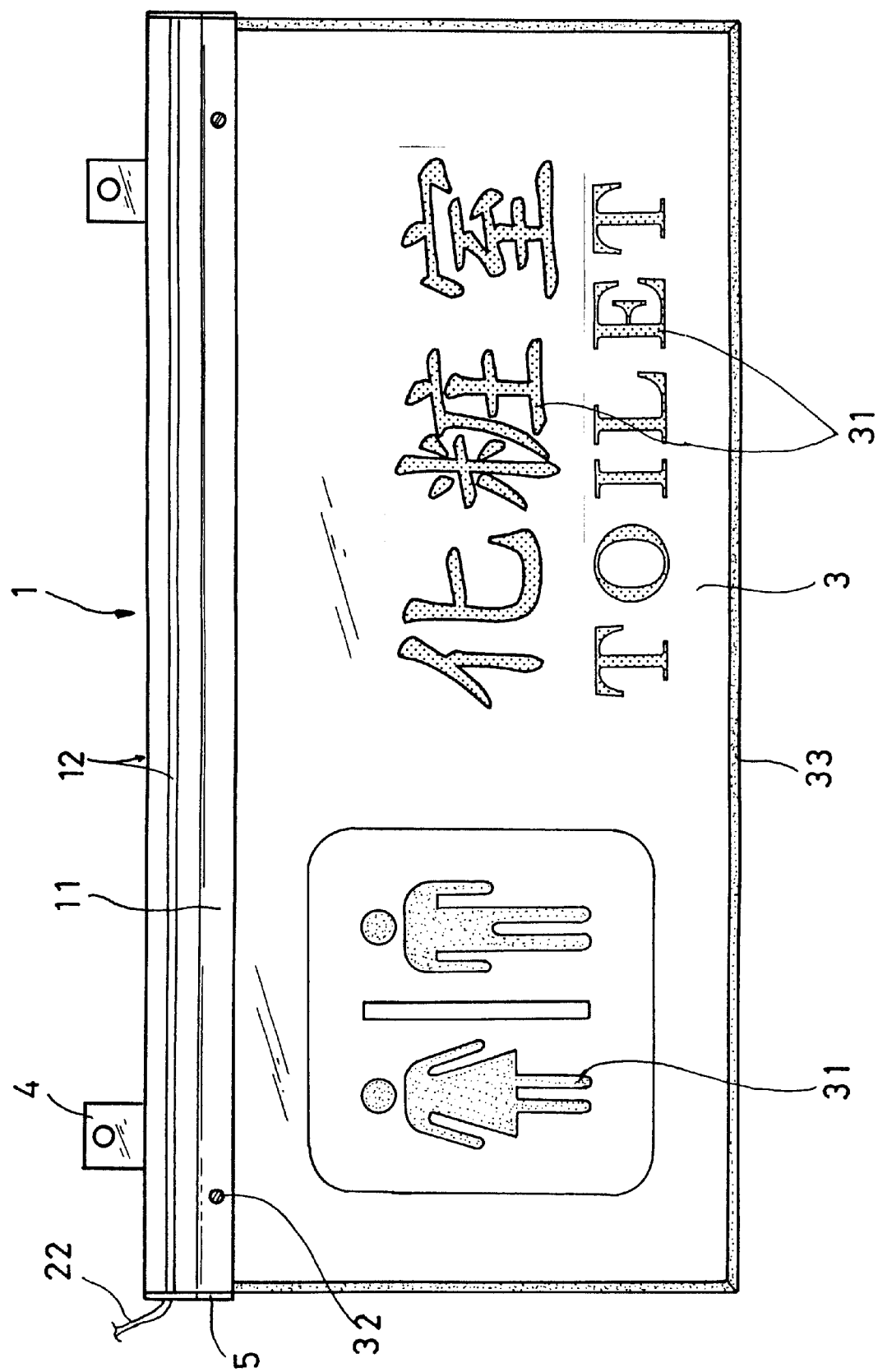
FIG. 5 is a front view of an alternate form of the signboard according to the present invention.
Figure 6:
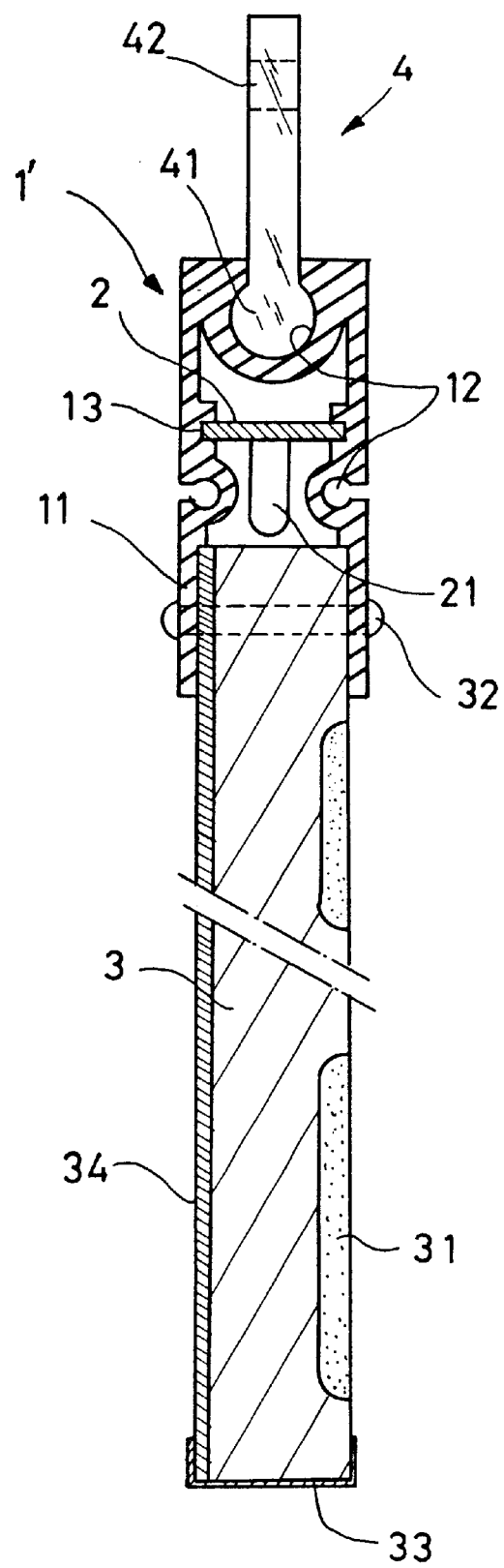
FIG. 6 is a sectional view of the present invention, showing an alternate form of the rail.
Figure 7:
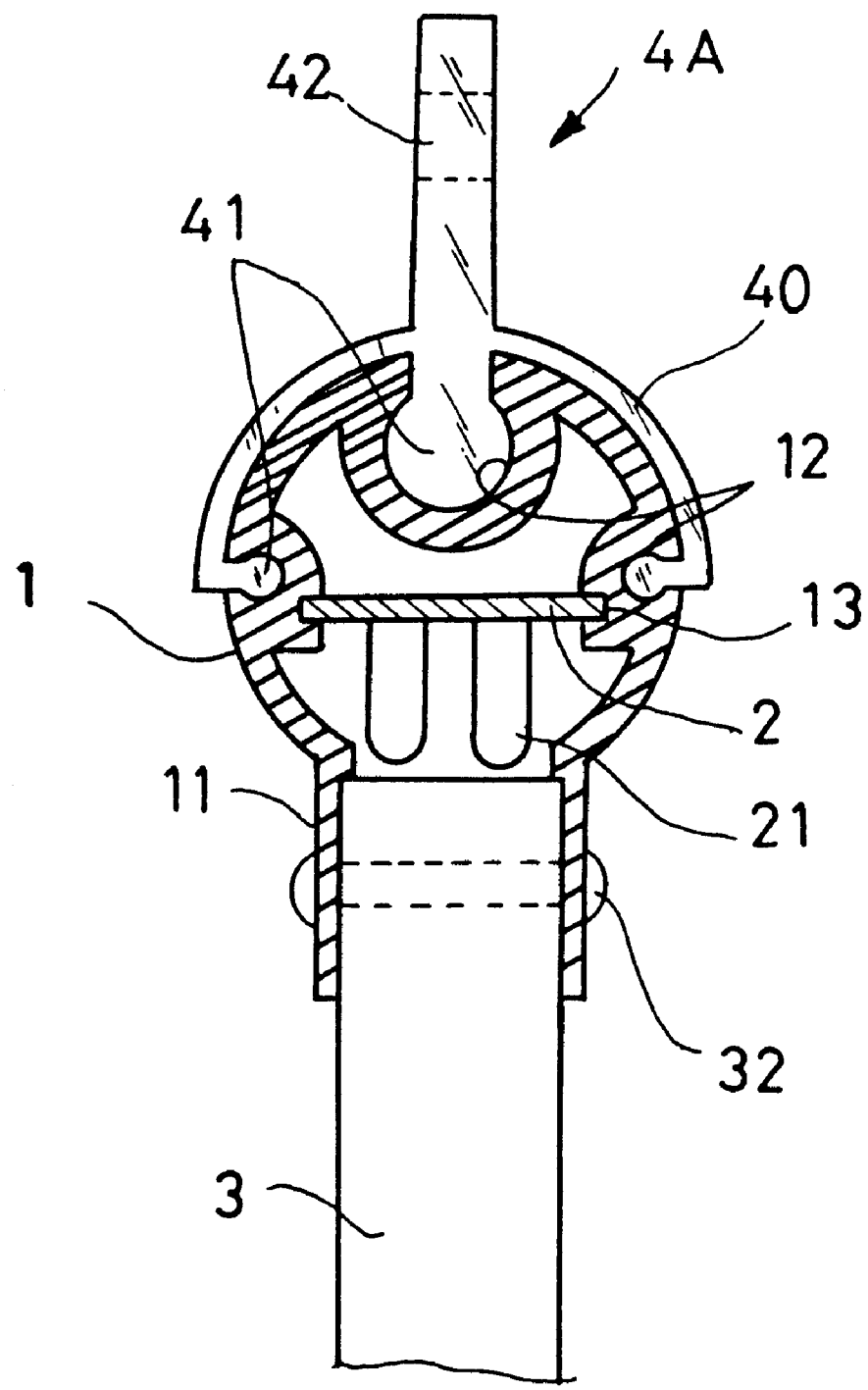
FIG. 7 is a sectional view of a part of the present invention, showing an alternate form of the mounting member.

The light conducting board 3 is provided with any of a variety of designs 31 (see FIGS. 1 and 5. Opaque coverings 33 are covered on the periphery of the light conducting board 3 to stop light from passing through the periphery of the light conducting board 3 (see Figures from 1 through 3). An opaque back board 34 may be covered on the backside of the light conducting board 3, enabling light to pass through the front side of the light conducting board 3 only (see FIG. 4). In Figures from 1 through 5, the rail 1 is shaped like a round tube. FIG. 6 shows an alternate form of the present invention. According to this alternate form, the rail 1' has a rectangular profile.

The light conducting board 3 is preferably made from transparent acrylics for the advantage of low manufacturing cost and high light conductivity. However, the height of the light conducting board is preferably set at 15 cm. Due to limited intensity of light, the LEDs 21 cannot well illuminate objects at a distance over 20 cm. Therefore, it is suggested that the light conducting board 3 has a height within 15~20 cm. There is no critical limitation on the length of the light conducting board. The length of the light conducting board 3 can be determined subject to actual requirements. The LEDs 21 of the LED circuit board 2 can have different colors as desired.

Referring to FIG. 3 again, when the LEDs 21 of the LED circuit board 2 are turned on, light from the LEDs 21 is guided by the parallel flanges 11 of the rail 1 toward the light conducting board 3 to illuminate the sign 31. The longitudinal coupling grooves 12 of the rail 1 can have a C-shaped or T-shaped cross section. After insertion of the at least one coupling rib 41 of the mounting members 4 or 4A into the at least one longitudinal coupling groove 12 in longitudinal direction, the mounting members 4 or 4A and the rail 1 are coupled together, and the mounting members 4 or 4A can be moved longitudinally relative to the rail 1 along the at least one coupling groove 12 to the desired location.

FIG. 8 shows another alternate form of the present invention. According to this alternate form, the mounting members 4B is designed for supporting the signboard on a flat surface in a vertical position, i.e., this alternate form eliminates the aforesaid hanging hole 42 from the mounting members 4B.

It is to be understood that the drawings are designed for purposes of illustration only, and are not intended for use as a definition of the limits and scope of the invention disclosed. For example, the light conducting board can be made having a dark colored backside.

What the invention claimed is:

1. A signboard comprising:

a longitudinally extended rail formed in one-piece formation, said rail having (a) a tubular contour wherein a cavity extends longitudinally therethrough, (b) an opening formed through a wall thereof and extending between opposing longitudinal ends of said rail, said opening being in open communication with said cavity, (c) a pair of parallel longitudinally extended flanges respectively disposed on opposing sides of said opening and extending from said wall, (d) a pair of longitudinally extended mounting grooves respectively formed on opposing wall surfaces internal to said cavity, and (e) a plurality of coupling grooves formed in angularly spaced relationship in an outer surface of said rail, one of said coupling grooves being located in diametrically opposed relationship with respect to said opening;

a circuit board mounted in said mounting grooves within said cavity and carrying a plurality of light emitting diodes arranged in a plurality of rows, said plurality of light emitting diodes extending toward said opening;

a light conducting board carrying indicia being disposed in said opening in said rail for transmission of light from said plurality of light emitting diodes, said light conducting board being affixed to said pair of flanges, said light conducting board having an opaque rear side;

a pair of end caps mounted to said longitudinal ends of said rail; and, a plurality of mounting members coupled to said rail for securing said rail to a base surface, each of said mounting members having a plurality of coupling ribs respectively engaged within a corresponding one of said coupling grooves.

2. The signboard as recited in claim 1, wherein said plurality of light emitting diodes include light emitting diodes of different colors.

* * * * *